US009749338B2

(12) United States Patent
Sartin et al.

(10) Patent No.: US 9,749,338 B2
(45) Date of Patent: Aug. 29, 2017

(54) SYSTEM SECURITY MONITORING (75) Inventors: A. Bryan Sartin, Dallas, TX (US); Gina M. Ganley, Millstone Township, NJ (US); Kevin Long, Marysville, PA (US); Jo Ann Joels, Tulsa, OK (US); Andrew J. Bonillo, Jr., Ashburn, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 623 days.

(21) Appl. No.: 13/329,931

(22) Filed: Dec. 19, 2011

(65) Prior Publication Data

US 2013/0160119 A1  Jun. 20, 2013

(51) Int. Cl.
*H04L 29/06* (2006.01)
*G06F 21/55* (2013.01)

(52) U.S. Cl.
CPC ........ *H04L 63/1416* (2013.01); *G06F 21/552* (2013.01); *H04L 63/1433* (2013.01)

(58) Field of Classification Search
CPC ............. H04L 63/1416; H04L 63/1425; H04L 63/1433; H04L 63/1408; H04L 63/14
USPC ..................................................... 726/22–25
See application file for complete search history.

(56) References Cited

U.S. PATENT DOCUMENTS

| | | | |
|---|---|---|---|
| 5,452,442 A * | 9/1995 | Kephart | 714/38.1 |
| 6,279,113 B1 * | 8/2001 | Vaidya | 726/23 |
| 6,754,662 B1 * | 6/2004 | Li | 707/693 |
| 7,028,338 B1 * | 4/2006 | Norris et al. | 726/23 |
| 7,328,349 B2 * | 2/2008 | Milliken | 713/181 |
| 7,512,980 B2 * | 3/2009 | Copeland | H04L 63/1416 705/51 |
| 7,587,761 B2 * | 9/2009 | Duffield | H04L 63/1408 726/11 |
| 7,624,446 B1 * | 11/2009 | Wilhelm | 726/23 |
| 7,707,305 B2 * | 4/2010 | Afek et al. | 709/238 |
| 7,941,855 B2 * | 5/2011 | Sung | H04L 63/1408 713/188 |
| 7,944,822 B1 * | 5/2011 | Nucci | H04L 41/142 370/229 |
| 8,065,729 B2 * | 11/2011 | Yi et al. | 726/22 |
| 8,079,083 B1 * | 12/2011 | Bennett et al. | 726/23 |
| 8,185,930 B2 * | 5/2012 | Alperovitch et al. | 726/1 |
| 8,800,036 B2 * | 8/2014 | Khayam | H04L 63/1425 709/206 |

(Continued)

OTHER PUBLICATIONS

Farid et al.; Anomaly Network Intrusion Detection Based on Improved Self Adaptive Bayesian Algorithm; 2010; Retrieved from the Internet <URL: www.jcomputers.us/vol5/jcp0501-03.pdf>; pp. 1-9 as printed.*

(Continued)

*Primary Examiner* — Zachary A Davis (57) ABSTRACT

A computing device may receive netflow data that includes information corresponding to network-side activity associated with a target device. The computing device may evaluate the netflow data based on a netflow signature to identify potentially malicious activity. The netflow signature may include information corresponding to two or more network events occurring in a particular order. The computing device may report, to another computing device, that potentially malicious activity, corresponding to the network data, has been detected based on the evaluation of the netflow data.

19 Claims, 7 Drawing Sheets (56) References Cited

U.S. PATENT DOCUMENTS

| | | | |
|---|---|---|---|
| 9,479,522 B1* | 10/2016 | Cirkovic | H04L 63/1416 |
| 2006/0242706 A1* | 10/2006 | Ross | 726/23 |
| 2007/0019548 A1* | 1/2007 | Krishnamurthy | 370/232 |
| 2008/0162452 A1* | 7/2008 | Cox | H04L 41/0893 |
| 2010/0154057 A1* | 6/2010 | Ko | H04L 63/1416 |
| | | | 726/23 |

OTHER PUBLICATIONS

Faour et al.; A SOM and Bayesian Network Architecture for Alert Filtering in Network Intrusion Detection Systems; 2006; Retrieved from the Internet <URL: ieeexplore.ieee.org/xpls/abs_all.jsp?arnumber=1684924&tag=1>; pp. 1-6 as printed.*

Roesch, Martin; SNORT—Lightweight Intrusion Detection for Networks; 1999; Retrieved from the Internet <URL: static.usenix.org/publications/library/proceedings/lisa99/full_papers/roesch/roesch.pdf>; pp. 1-11 as printed.*

* cited by examiner

SYSTEM SECURITY MONITORING

BACKGROUND

Currently available computer technologies include security solutions for protecting networks and devices from unauthorized intrusions. However, the solutions provided by such technologies are inadequate. For example, many security solutions are limited to investigating internal system events or activity, fail to adequately detect on-going security breaches, and/or involve inefficient security procedures, such as on-site computer forensics work.

DETAILED DESCRIPTION OF PREFERRED EMBODIMENTS

The following detailed description refers to the accompanying drawings. The same labels and/or reference numbers in different drawings may identify the same or similar elements.

In one or more implementations, described herein, systems and devices may be used to monitor system security. For example, a security monitoring system may receive netflow data corresponding to external activity associated with a target system, and evaluate the netflow data based on netflow signatures and/or an activity watchlist. Netflow data may include information corresponding to network-side activity or network traffic corresponding to a particular system, network, or device (e.g., the target system). For example, netflow data may include source identifiers (e.g., Internet Protocol (IP) addresses), destination identifiers (e.g., IP addresses), ports, or another type of traffic data or traffic metadata.

A netflow signature may include one or more events occurring in a particular order and/or within a particular amount of time that might signify pre-attack research, points of intrusion, unauthorized access, data extraction, or another type of malicious or unwanted activity. An activity watchlist may include a list of identifiers corresponding to known or previously identified sources of suspicious, malicious, or otherwise unwanted activity. The security monitoring system may identify a risk factor associated with the netflow data and determine whether the risk factor exceeds a particular risk threshold corresponding to the target system. If the risk factor does not exceed the risk threshold, the security monitoring system may merely record the netflow data in a data repository. However, if the risk factor exceeds the risk threshold, the security monitoring system may report, to a feedback and reporting system, that potentially malicious activity has been detected.

The security monitoring system may also, or alternatively, receive inputs from the feedback and reporting system. For example, the security monitoring system may receive information that confirms or refutes whether netflow data reported as being potentially associated with malicious activity was, in fact, associated with malicious activity. In some implementations, the security monitoring system may use such information to, for example, update the netflow signatures used to evaluate future netflow data, modify the manner in which the risk factor is determined, modify the risk threshold applied to the risk factor, or in another manner to improve the services of the security monitoring system.

Since the security monitoring system is capable of evaluating netflow data, the security monitoring system is not bound by investigating internal system activity. Rather, the security monitoring system is capable of monitoring system security from an external or network perspective. In addition, since the netflow signatures used by the security monitoring system may include a wide variety of events occurring in a particular order and/or within a particular amount of time, the security monitoring system may provide a solution to sifting through a significant amount of netflow data and accurately identifying malicious activity. Further, the use of discrete data structures, such as netflow signatures, in identifying potentially malicious activity may enable the security monitoring system to more efficiently analyze netflow data in real-time. Moreover, the use of a risk threshold may enable the security monitoring system to customize the level of reporting sensitivity according to the requirements of a particular target system. Also, enabling the security monitoring system to receive and modify one or more operations or processes based on feedback may enable the security monitoring system to become more and more accurate and efficient.

Figure 1:
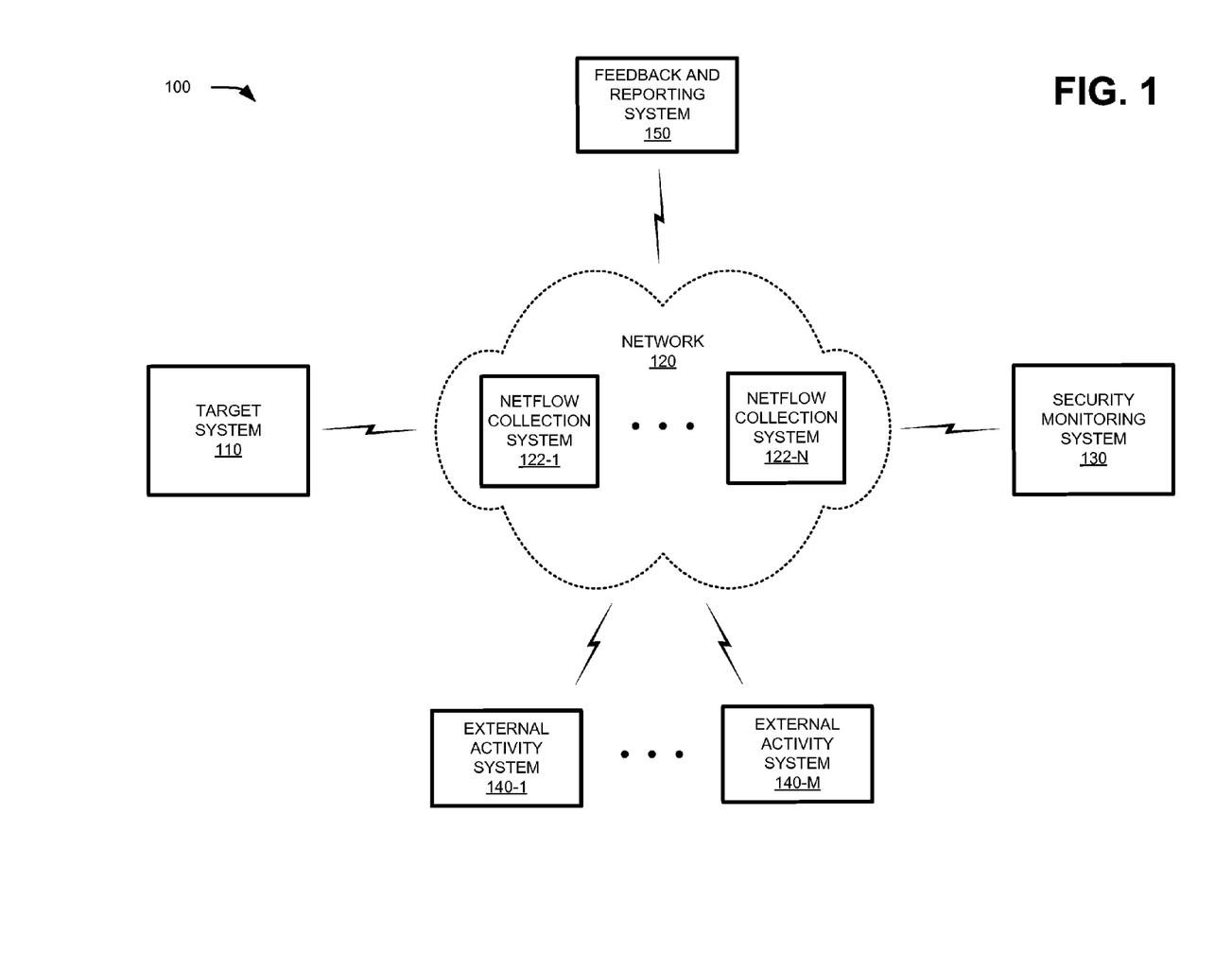
FIG. 1 is a diagram of an example environment in which systems and/or methods, described herein, may be implemented.

FIG. 1 is a diagram of an example environment 100 in which systems and/or methods, described herein, may be implemented. As depicted, environment 100 may include a target system 110, a network 120, netflow collection systems 122-1, . . . , 122-N (where N≥1) (hereinafter referred to individually as "netflow collection system 122," and collectively as "netflow collection systems 122"), a security monitoring system 130, external activity systems 140-1, . . . , 140-M (where M≥1) (hereinafter referred to individually as "external activity system 140," and collectively as "external activity systems 140"), and feedback and reporting system 150.

The number of systems and/or networks, illustrated in FIG. 1, is provided for explanatory purposes only. In practice, there may be additional systems and/or networks, fewer systems and/or networks, different systems and/or networks, or differently arranged systems and/or networks than illustrated in FIG. 1.

Also, in some implementations, one or more of the systems of environment 100 may perform one or more functions described as being performed by another one or more of the systems of environment 100. Systems of environment 100 may interconnect via wired connections, wireless connections, or a combination of wired and wireless connections.

Target system 110 may include one or more types of computing and/or communication devices. For example, target system 110 may include a desktop computer, a server, a cluster of servers, a router, or one or more other types of computing and/or communication devices. Target system 110 may be capable of communicating with network 120. In one example, target system 110 may correspond to a particular organization that has retained or otherwise activated the system security services or capabilities of security monitoring system 130.

Network 120 may include any type of network and/or combination of networks. For example, network 120 may include a LAN (e.g., an Ethernet network), a wireless LAN (WLAN) (e.g., an 802.11 network), a wide area network (WAN) (e.g., the Internet), a wireless WAN (WWAN) (e.g., a 3GPP System Architecture Evolution (SAE) Long-Term Evolution (LTE) network, a Global System for Mobile Communications (GSM) network, a Universal Mobile Telecommunications System (UMTS) network, a Code Division Multiple Access 2000 (CDMA2000) network, a High-Speed Packet Access (HSPA) network, a Worldwide Interoperability for Microwave Access (WiMAX) network, etc.). Additionally, or alternatively, network 120 may include a fiber optic network, a metropolitan area network (MAN), an ad hoc network, a virtual network (e.g., a virtual private network (VPN)), a telephone network (e.g., a Public Switched Telephone Network (PSTN)), a cellular network, a Voice over IP (VoIP) network, or another type of network. In one example, network 120 may include a network backbone corresponding to the Internet or another type of WAN.

Netflow collection system 122 may include one or more types of computing and/or communication devices. For example, netflow collection system 122 may include a desktop computer, a server, a cluster of servers, a router, a switch, or one or more other types of computing and/or communication devices. In one example, netflow collection system 122 may include a router (e.g., a core router), a server, or another type of backbone network system or device. Netflow collection system 122 may be capable of identifying netflow data corresponding to a particular system or device (e.g., target system 110), collecting the netflow data, and/or providing the netflow data (or a copy of the netflow data) to security monitoring system 130.

Security monitoring system 130 may include one or more types of computing and/or communication devices. For example, security monitoring system 130 may include a desktop computer, a server, a cluster of servers, a router, or one or more other types of computing and/or communication devices. Security monitoring system 130 may be capable of receiving netflow data from netflow collection system 122, evaluating the netflow data based on netflow signatures, and/or determining whether a risk factor associated with the netflow data exceeds a risk threshold. Additionally, or alternatively, security monitoring system 130 may report (e.g., to feedback and reporting system 150) that potentially malicious activity is occurring if the risk factor exceeds the risk threshold. Security monitoring system 130 may also, or alternatively, receive feedback data and modify one or more operations or processes based on the feedback data. Feedback data, as described herein, may include any type of information relating to malicious or otherwise unwanted activity, such as information confirming whether previously reported netflow data was, in fact, associated with malicious activity, information identifying a netflow signature (or a component of a netflow signature), information regarding a risk factor, information regarding the calculation of a risk factor, information regarding a risk threshold, etc.

External activity system 140 may include one or more types of computing and/or communication devices. For example, external activity system 140 may include a laptop computer, a desktop computer, a tablet computer, a mobile telephone (e.g., a smart phone), a server, a cluster of servers, a router, or one or more other types of computing and/or communication devices. In one example, external activity system 140 may also, or alternatively, include a proxy device, such as a proxy server, a remote desktop device, etc. External activity system 140 may be capable of communicating with target system 110 via network 120. In one example, external activity system 140 may be capable of interacting with target system 110 in a malicious or otherwise unauthorized manner (e.g., by scanning target system 110 for vulnerabilities, by obtaining unauthorized access to target system 110, by obtaining data from target system 110 without authorization, etc.).

Feedback and reporting system 150 may include one or more types of computing and/or communication devices. For example, feedback and reporting system 150 may include a desktop computer, a server, a cluster of servers, a router, or one or more other types of computing and/or communication devices. Feedback and reporting system 150 may receive reports from security monitoring system 130 regarding netflow data that appears to be associated with malicious activity. Additionally, or alternatively, feedback and reporting system 150 may provide feedback data to security monitoring system 130 regarding the netflow data reported to feedback and reporting system 150.

Figure 2:
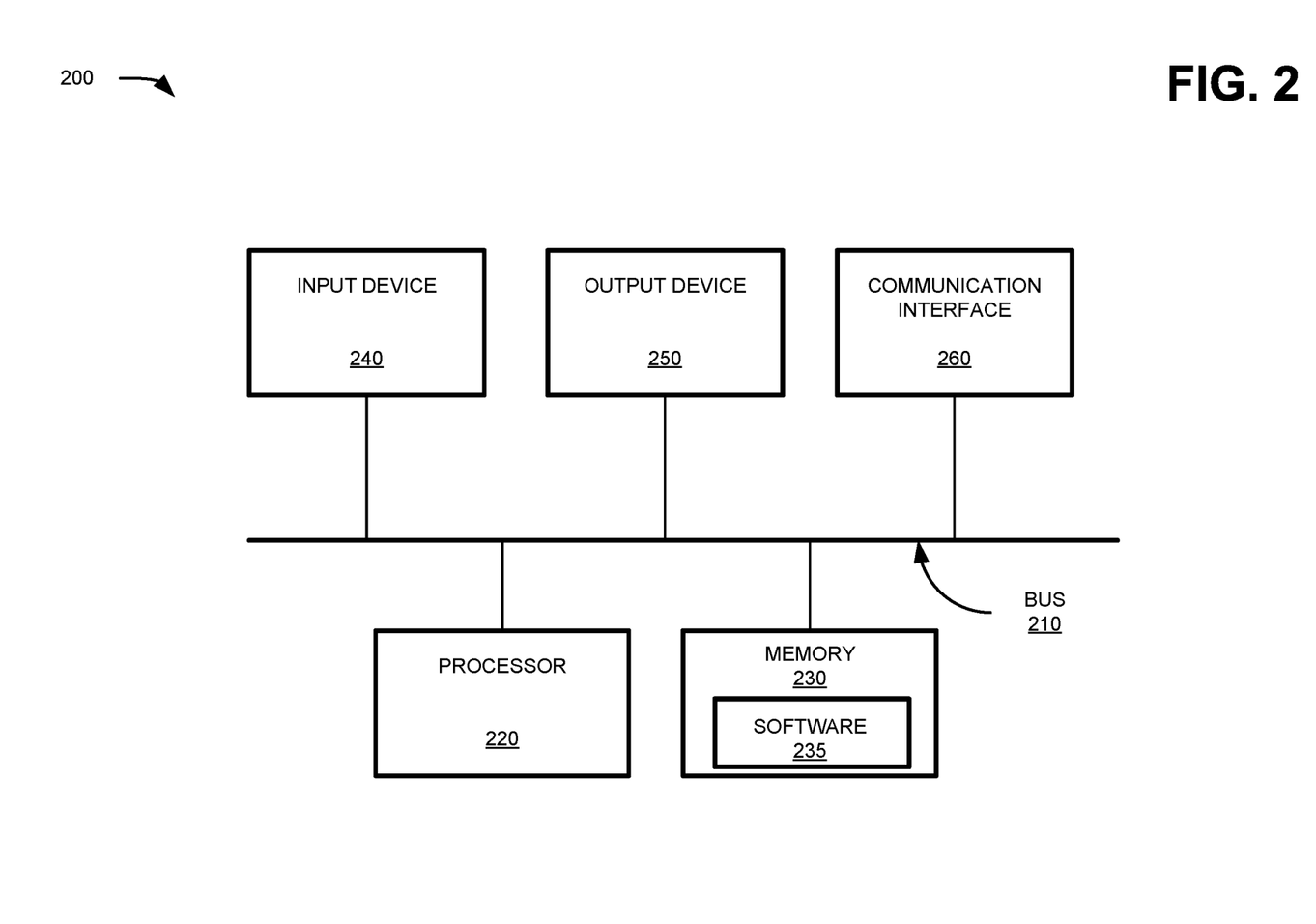
FIG. 2 is a diagram of an example device of FIG. 1.

FIG. 2 is a diagram of example components of a device 200 that may be used within environment 100 of FIG. 1. Device 200 may correspond to target system 110, netflow collection system 122, security monitoring system 130, external activity system 140, and/or feedback and reporting system 150. Each of target system 110, netflow collection system 122, activity investigation system 130, external activity system 140, and/or feedback and reporting system 150 may include one or more of devices 200 and/or one or more of the components of device 200.

As depicted, device 200 may include bus 210, processor 220, memory 230, input device 240, output device 250, and communication interface 260. However, the precise components of device 200 may vary between implementations. For example, depending on the implementation, device 200 may include fewer components, additional components, different components, or differently arranged components than those illustrated in FIG. 2.

Bus 210 may permit communication among the components of device 200. Processor 220 may include one or more processors, microprocessors, data processors, co-processors, network processors, application-specific integrated circuits (ASICs), controllers, programmable logic devices (PLDs), chipsets, field-programmable gate arrays (FPGAs), or other components that may interpret or execute instructions or data. Processor 220 may control the overall operation, or a portion thereof, of device 200, based on, for example, an operating system (not illustrated) and/or various applications. Processor 220 may access instructions from memory 230, from other components of device 200, or from a source external to device 200 (e.g., a network or another device).

Memory 230 may include memory and/or secondary storage. For example, memory 230 may include random access memory (RAM), dynamic RAM (DRAM), read-only memory (ROM), programmable ROM (PROM), flash memory, or some other type of memory. Memory 230 may include a hard disk (e.g., a magnetic disk, an optical disk, a magneto-optic disk, a solid state disk, etc.) or some other type of computer-readable medium, along with a corresponding drive. A computer-readable medium may be defined as a non-transitory memory device. A memory device may include space within a single physical memory device or spread across multiple physical memory devices.

Input device 240 may include one or more components that permit a user to input information into device 200. For example, input device 240 may include a keypad, a button, a switch, a knob, fingerprint recognition logic, retinal scan logic, a web cam, voice recognition logic, a touchpad, an input port, a microphone, a display, or some other type of input component. Output device 250 may include one or more components that permit device 200 to output information to a user. For example, output device 250 may include a display, light-emitting diodes (LEDs), an output port, a speaker, or some other type of output component.

Communication interface 260 may include one or more components that permit device 200 to communicate with other devices or networks. For example, communication interface 260 may include some type of wireless or wired interface. Communication interface 260 may also include an antenna (or a set of antennas) that permit wireless communication, such as the transmission and reception of radio frequency (RF) signals.

As described herein, device 200 may perform certain operations in response to processor 220 executing software instructions 235 contained in a computer-readable medium, such as memory 230. The software instructions 235 may be read into memory 230 from another computer-readable medium or from another device via communication interface 260. The software instructions 235 contained in memory 230 may cause processor 220 to perform one or more processes described herein. Alternatively, hardwired circuitry may be used in place of, or in combination with, software instructions 235 to implement processes described herein. Thus, implementations described herein are not limited to any specific combination of hardware circuitry and software.

The number of components, illustrated in FIG. 2, is provided for explanatory purposes only. In practice, there may be additional components, fewer components, different components, or differently arranged components than illustrated in FIG. 1.

Figure 3:
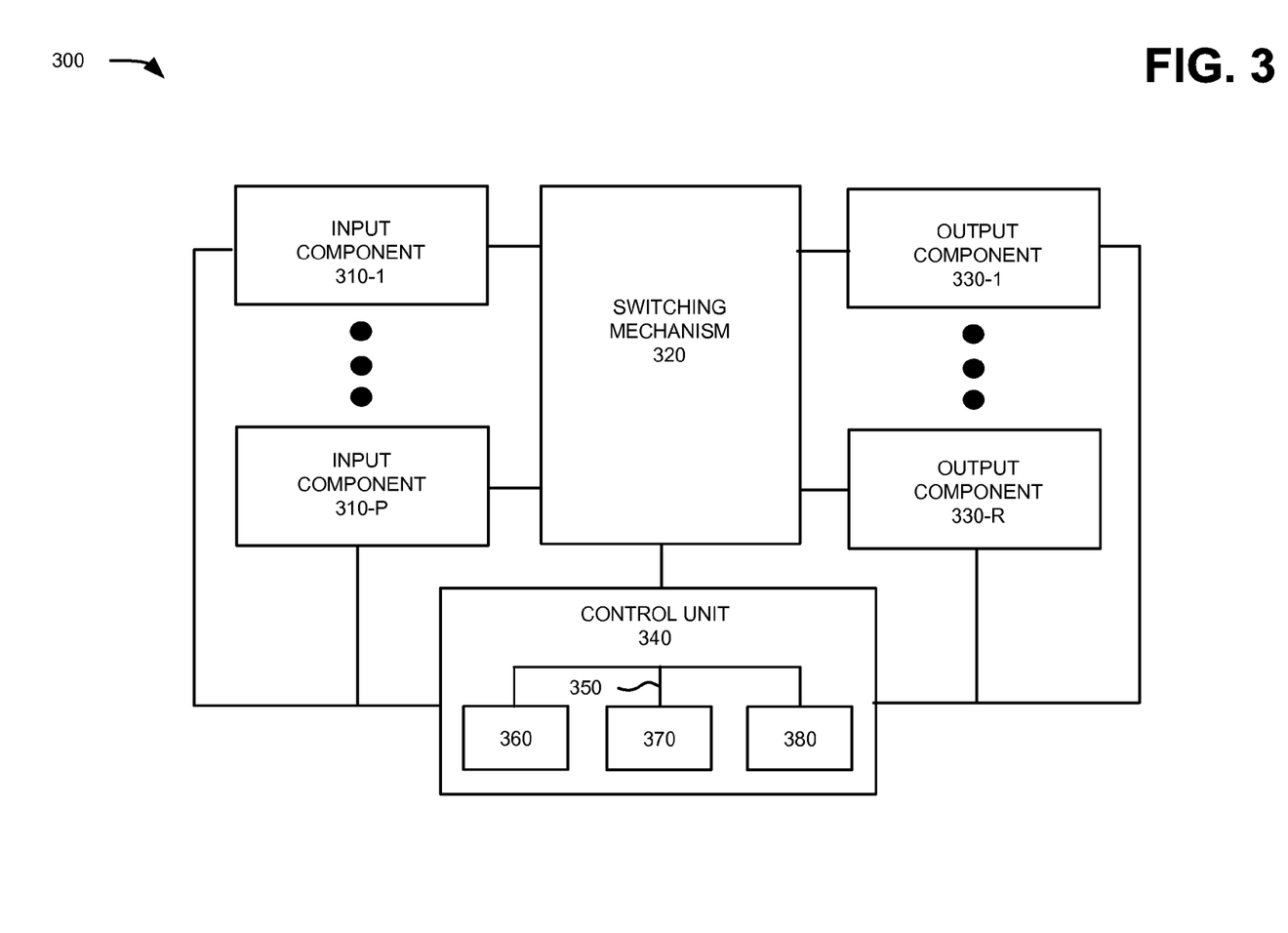
FIG. 3 is a diagram of an example network device of FIG. 1.

FIG. 3 is a diagram of an example network device 300 of FIG. 1 that may be used within environment 100. For example, since target system 110, netflow collection system 122, security monitoring system 130, external activity system 140, and/or feedback and reporting system 150 may include a network device, such as a router, a gateway, a firewall, a switch, etc., network device 300 may correspond to target system 110, netflow collection system 122, security monitoring system 130, external activity system 140, and/or feedback and reporting system 150. In addition, each of target system 110, netflow collection system 122, security monitoring system 130, and/or external activity system 140 may include one or more network devices 300 and/or one or more of the components of network device 300.

As depicted, network device 300 may include input components 310-1, . . . , 310-P (where P≥1) (collectively referred to as "input components 310," and individually as "input component 310"), switching mechanism 320, output components 330-1, . . . , 330-R (where R≥1) (collectively referred to as "output components 330," and individually as "output component 330"), and control unit 340 (which may include bus 350, processor 360, memory 370, and communication interface 380). However, the precise components of network device 300 may vary between implementations. For example, depending on the implementation, network device 300 may include fewer components, additional components, different components, or differently arranged components than those illustrated in FIG. 3.

Input components 310 may be points of attachment for physical links and may be the points of entry for incoming traffic. Input components 310 may perform datalink layer encapsulation and/or decapsulation. Input components 310 may look up a destination address of incoming traffic (e.g., any type or form of data, such as packet data or non-packet data) in a forwarding table (e.g., a media access control (MAC) table) to determine a destination component or a destination port for the data (e.g., a route lookup). In order to provide quality of service (QoS) guarantees, input ports 310 may classify traffic into predefined service classes. Input ports 310 may run datalink-level protocols and/or network-level protocols.

Switching mechanism 320 may include a switching fabric that provides links between input components 310 and output components 330. For example, switching mechanism 320 may include a group of switching devices that route traffic from input components 310 to output components 330.

Output components 330 may store traffic and may schedule traffic on one or more output physical links. Output components 330 may include scheduling algorithms that support priorities and guarantees. Output components 330 may support datalink layer encapsulation and decapsulation, and/or a variety of higher-level protocols.

Control unit 340 may interconnect with input components 310, switching mechanism 320, and output components 330. Control unit 340 may perform control plane processing, including computing and updating forwarding tables, manipulating QoS tables, maintaining control protocols, etc. Control unit 340 may process any traffic whose destination address may not be found in the forwarding table.

In one embodiment, control unit 340 may include a bus 350 that may include one or more paths that permits communication among processor 360, memory 370, and communication interface 380. Processor 360 may include a microprocessor or processing logic (e.g., an application specific integrated circuit (ASIC), field programmable gate array (FPGA), etc.) that may interpret and execute instructions, programs, or data structures. Processor 360 may control operation of network device 300 and/or one or more of the components of network device 300.

Memory 370 may include a random access memory (RAM) or another type of dynamic storage device that may store information and/or instructions for execution by processor 360, a read only memory (ROM) or another type of static storage device that may store static information and/or instructions for use by processor 360, a flash memory (e.g., an electrically erasable programmable read only memory (EEPROM)) device for storing information and/or instructions, and/or some other type of magnetic or optical recording medium and its corresponding drive. Memory 370 may also store temporary variables or other intermediate information during execution of instructions by processor 360.

Communication interface 380 may include any transceiver-like mechanism that enables control unit 340 to communicate with other devices and/or systems. For example, communication interface 380 may include a modem or an Ethernet interface to a LAN. Additionally or alternatively, communication interface 380 may include mechanisms for communicating via a wireless network (e.g., a WLAN and/or a WWAN). Communication interface 380 may also include a console port that may allow a user to interact with control unit 340 via, for example, a command line interface. A user may configure network device 300 via a console port (not shown in FIG. 3).

Network device 300 may perform certain operations, as described in detail herein. Network device 300 may perform these operations in response to, for example, processor 360 executing software instructions (e.g., computer program(s)) contained in a computer-readable medium, such as memory 370, a secondary storage device (e.g., hard disk, CD-ROM, etc.), or other forms of RAM or ROM.

The software instructions may be read into memory 370 from another computer-readable medium, such as a data storage device, or from another device via communication interface 380. The software instructions contained in memory 370 may cause processor 360 to perform processes that will be described later. Alternatively, hardwired circuitry may be used in place of, or in combination with, software instructions to implement processes described herein. Thus, implementations described herein are not limited to any specific combination of hardware circuitry and software.

Figure 4:
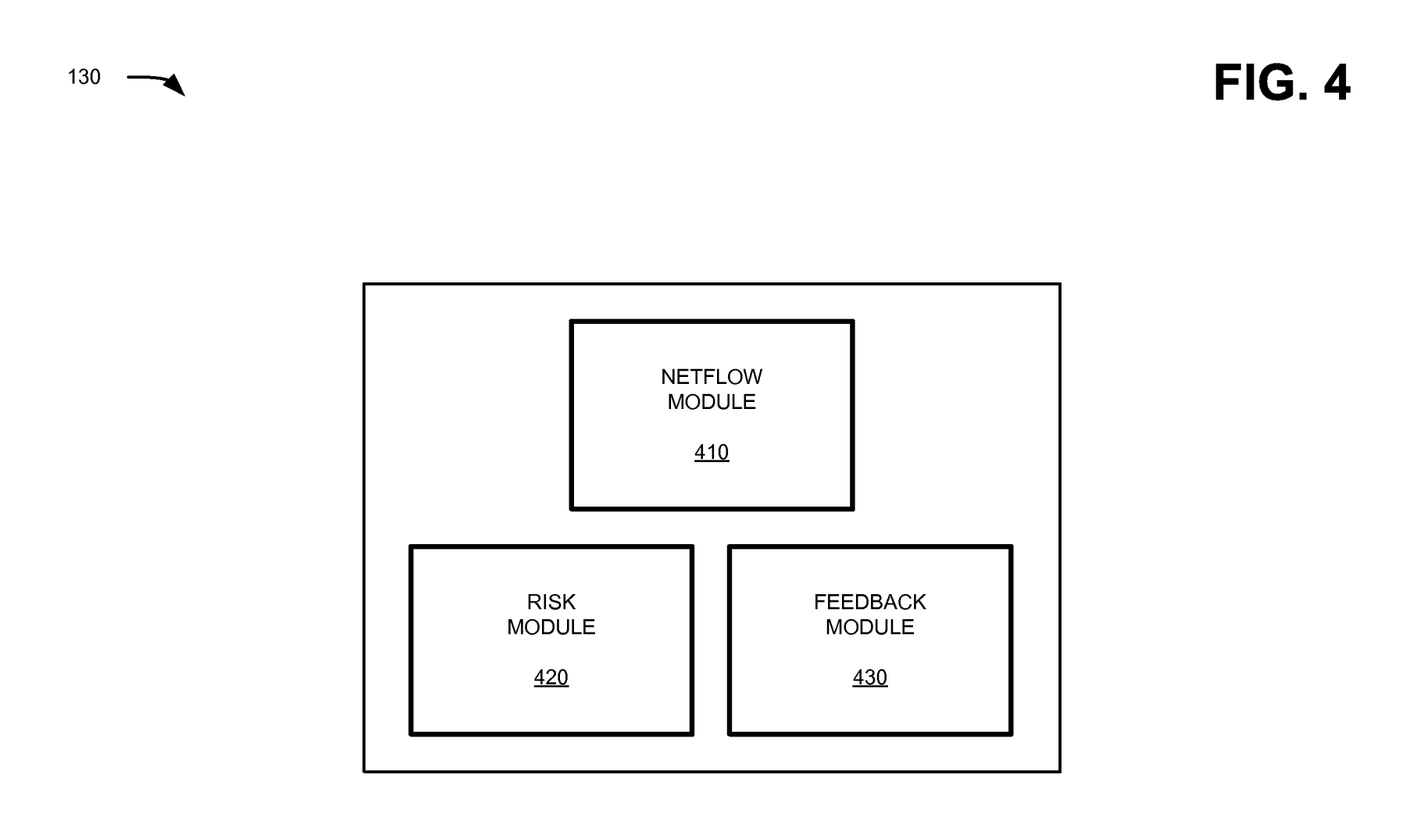
FIG. 4 is a diagram of example functional components of an activity investigation system according to one or more implementations described herein.

FIG. 4 is a diagram of example functional components of security monitoring system 130 according to one or more implementations described herein. As depicted, security monitoring system 130 may include netflow module 410, risk module 420, and feedback module 430. Depending on the implementation, one or more of modules 410-430 may be implemented as a combination of hardware and software based on the components illustrated and described with respect to FIG. 2. Alternatively, modules 410-430 may each be implemented as hardware based on the components illustrated and described with respect to FIG. 2.

Netflow module 410 may provide functionality with respect to netflows. For example, netflow module 410 may enable security monitoring system 130 to receive netflow data and/or evaluate the netflow data based on netflow signatures. As mentioned above, netflow data may include information corresponding to network-side activity or network traffic corresponding to a particular system, network, or device (e.g., the target system). A netflow signature may include an array of events occurring in a particular order and/or within a particular amount of time that might signify pre-attack research, points of intrusion, unauthorized access, data extraction, or another type of malicious or unwanted activity. In some implementations, netflow module 410 may also, or alternatively, enable security monitoring system 130 to store the netflow data in a data storage repository storing netflow data associated with other netflows.

Risk module 420 may provide functionality with respect to identifying risks associated with netflow data. For example, risk module 420 may enable security monitoring system 130 to determine a risk factor associated with netflow data and determine whether the risk factor exceeds a risk threshold associated with target system 110. In some implementations, risk module 420 may also, or alternatively, enable security monitoring system 130 to report that the netflow data corresponds to potentially malicious activity if the risk factor exceeds the risk threshold.

Feedback module 430 may provide functionality with respect to feedback data. For example, feedback module 430 may enable security monitoring system 130 to receive feedback data from feedback and reporting system 150. As mentioned above, feedback data may include any type of information, operations, or processes, relating to malicious or otherwise unwanted activity, such as information confirming whether previously reported netflow data was, in fact, associated with malicious activity, information identifying a netflow signature (or a component of a netflow signature), information regarding a risk factor, information regarding the determination or calculation of a risk factor, information regarding a risk threshold, etc. In some implementations, feedback module 430 may also, or alternatively, enable security monitoring system 130 to modify one or more operations directed at evaluating netflow data, determining risk factors, determining whether a risk factor exceeds a risk threshold, or one or more other types of operations.

In addition to the functionality described above, the functional components of security monitoring system 130 may also, or alternatively, provide functionality as described elsewhere in this description. Further, while FIG. 4 shows a particular number and arrangement of modules, in alternative implementations, security monitoring system 130 may include additional modules, fewer modules, different modules, or differently arranged modules than those depicted.

Figure 5:
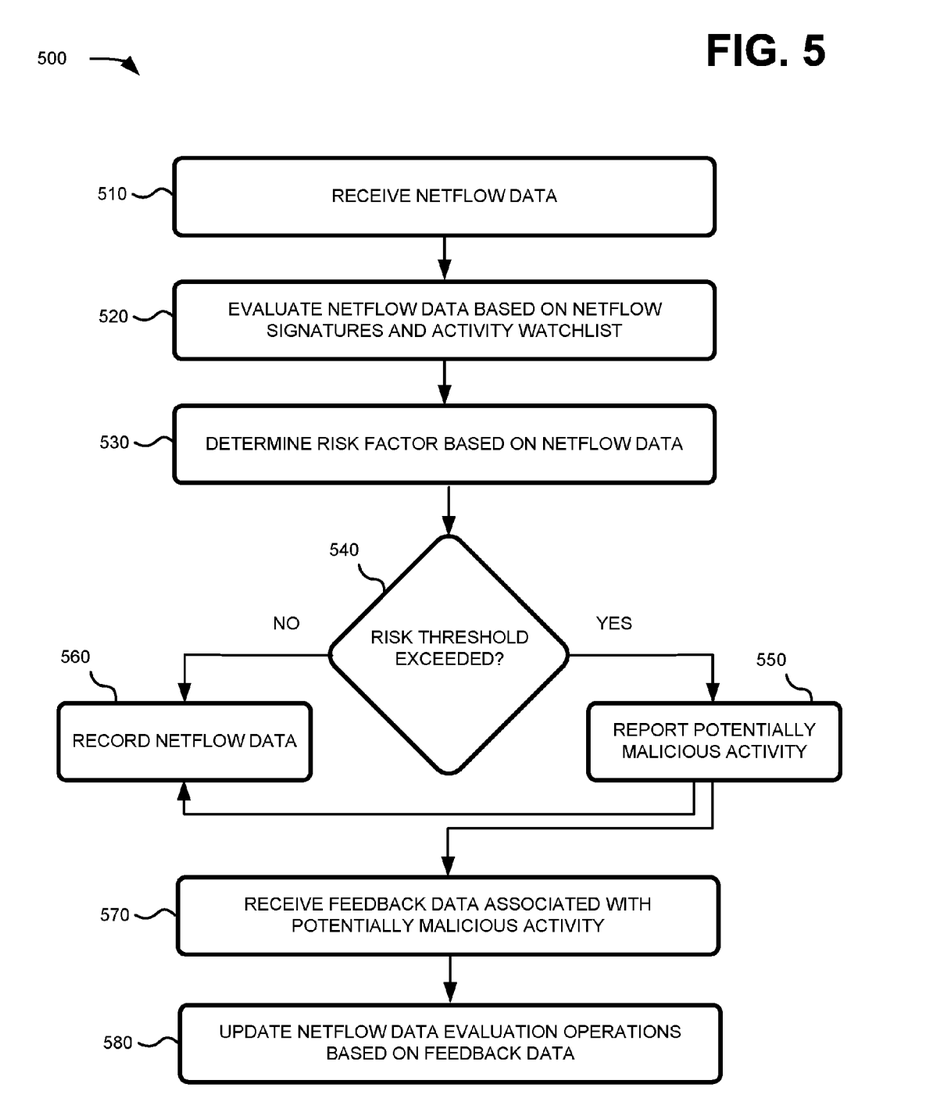
FIG. 5 is a diagram of an example process for system security monitoring according to one or more implementations described herein.

FIG. 5 is a diagram of an example process 500 for system security monitoring according to one or more implementations described herein. In one or more implementations, process 500 may be performed by one or more components of security monitoring system 130. In other implementations, some or all of process 500 may be performed by one or more other components/devices, or a group of components/devices, including or excluding security monitoring system 130. A description of FIG. 5 is provided below with reference to FIG. 6.

As shown in FIG. 5, process 500 may include receiving netflow data (block 510). For example, security monitoring system 130 may receive netflow data corresponding to target system 110. In one example, security monitoring system 130 may receive netflow data from netflow collection system 122. As mentioned above, netflow collection system 122 may include, for example, a router (e.g., a core router), a server, or another type of backbone network system or device.

Process 500 may also include evaluating netflow data based on netflow signatures and an activity watchlist (block 520). For example, security monitoring system 130 may evaluate netflow data based on one or more netflow signatures and/or an activity watchlist. As mentioned above, a netflow signature may include information describing or corresponding to one or more events occurring in a particular order and/or within a particular amount of time that might signify pre-attack research, points of intrusion, unauthorized access, data extraction, or another type of malicious or unwanted activity.

For example, a netflow signature corresponding to a distributed denial-of-service (DDOS) attack may describe one or more IP hosts (e.g., external activity systems 140) initiating unusually high quantities of traffic against a single target host (e.g., target system 110) on one or more specific transmission control protocol (TCP) target ports or user datagram protocol (UDP) target ports. In another example, a netflow signature corresponding to a brute force attack may describe many (e.g., 10s, 100s, or 1,000s) separate attempts from a single source host (e.g., external activity system 140) attempting to connect to a single target host (e.g., target system 110) on the same port. In some implementations, a netflow signature may also, or alternatively, include more basic indications of potentially malicious activity, such as a particular quantity of traffic to/from parts of the world where the customer does not typically experience traffic, unusual after hours connections, data transfers, or chatty IP addresses (e.g., an IP address that contacts target device 110 with a high level of frequency over a particular period of time). As such, a netflow signature may include one or more combinations of network events from which security monitoring system 130 may infer that potentially malicious activity (e.g., a possible crime in motion) is occurring.

An activity watchlist may include a list of identifiers (e.g., IP addresses) that identify known sources of malicious activity. For instance, the activity watchlist may include identifiers corresponding to external activity systems 140 that were previously identified in a different system attack, have appeared in previous security investigations, have been associated with suspicious TCP port activity, have been associated with suspicious UDP port activity, etc.

Figure 6:
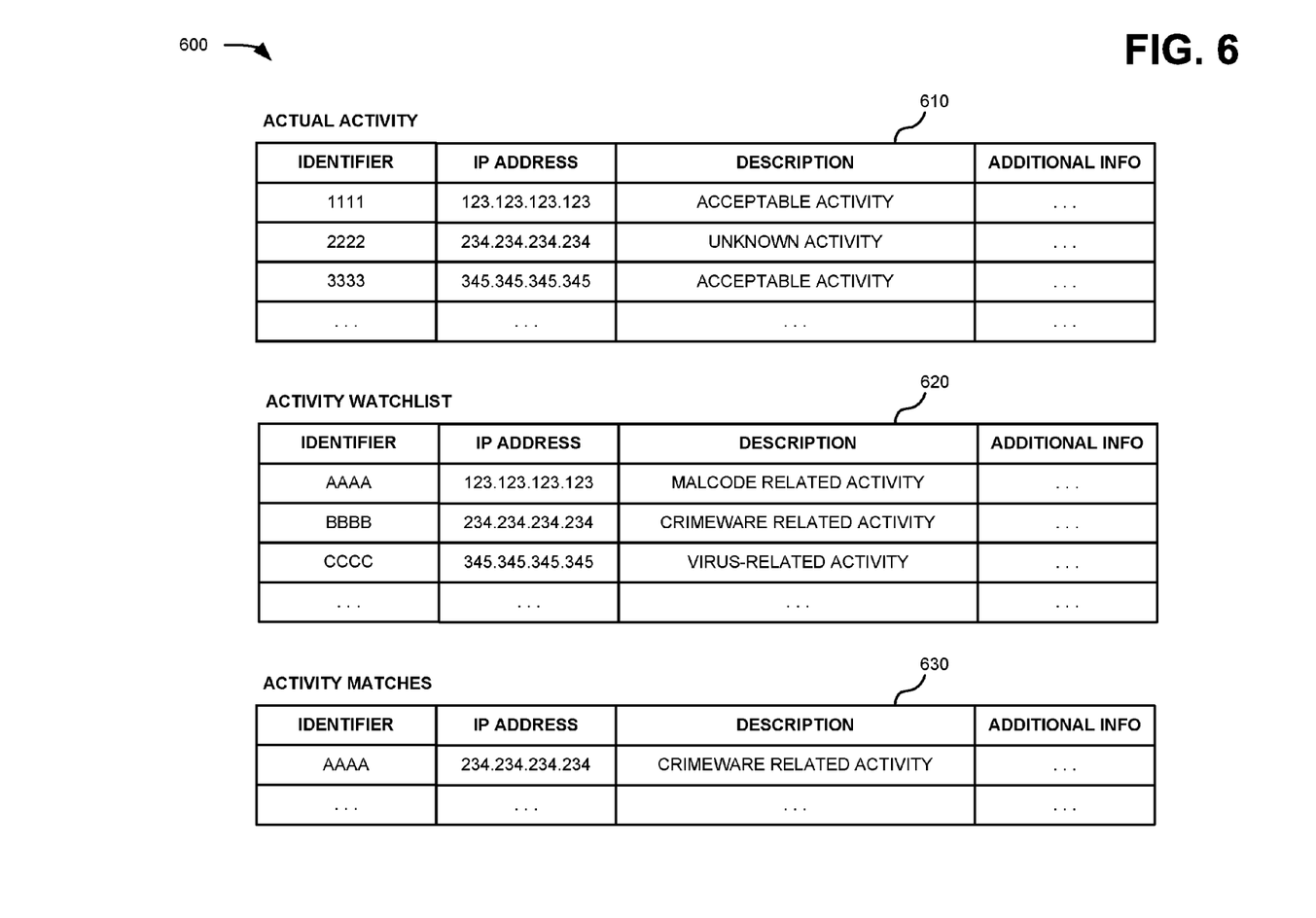
FIG. 6 is a diagram of example data structures according to one or more implementations described herein.

FIG. 6 is a diagram of example data structures 600 according to one or more implementations described herein. As depicted, data structures 600 may include an actual activity data structure 610, an activity watchlist data structure 620, and an activity matches data structure 630. Each data structure 600 may include a table that includes an identifier column, an IP address column, a description column, etc. Actual activity data structure 610 may correspond to external activity monitored by security monitoring system 130. Activity watchlist data structure 620 may correspond to known or previously identified sources of malicious activity.

As mentioned above, actual activity data structure 610 may be compared to activity watchlist data structure 620 to generate activity matches data structure 630, which may indicate whether any of the external activity being monitored by security monitoring system 130 corresponds to known sources of malicious activity. For instance, as depicted in the example of FIG. 6, external activity corresponding to IP address "234.234.234.234" is indicated in activity matches data structure 630, since IP address "234.234.234.234" is indicated in both actual activity data structure 610 and activity watchlist data structure 620. Accordingly, security monitoring system 130 may use an activity watchlist to identify known sources of malicious activity that are interacting with target system 110.

Returning now to FIG. 5, process 500 may include determining a risk factor based on the netflow data (block 530). For instance, security monitoring system 130 may determine a risk factor based on the netflow data. The risk factor may include a particular value, within a predetermined range of values, representing a level of threat corresponding to the netflow data. For instance, the predetermined range of values may be a number 1 to 10, where 1 corresponds to a low level of risk, 5 corresponds to a moderate level of risk, and 10 corresponds to a high level of risk. In one example, security monitoring system 130 may determine the risk factor by executing an operation or process that is customized, or otherwise particular to, target system 110. For instance, the risk factor may be dictated by, or otherwise based on, information (e.g., preference information) received from an individual or organization corresponding to target system 110.

As shown in FIG. 5, process 500 may also include determining whether the risk factor exceeds a risk threshold (block 540). For example, security monitoring system 130 may determine if the risk factor exceeds a risk threshold. In one example, the risk threshold may be based on, or otherwise particular to, target system 110. Additionally, or alternatively, the risk threshold may be based on, or otherwise particular to, a type of risk (e.g., a DDOS attack, a brute force attack, etc.) identified by the evaluation of the netflow data.

Process 500 may also, or alternatively, include recording the netflow data when the risk threshold is not exceeded (block 560). For example, security monitoring system 130 may record the netflow data when the risk threshold is not exceeded. In one example, security monitoring system 130 may record the netflow data in a particular data repository (e.g., a database or another type of data repository).

Additionally, or alternatively, process 500 may include reporting potentially malicious activity, corresponding to the netflow data, when the risk threshold is exceeded (block 550). For example, security monitoring system 130 may report that potentially malicious activity, corresponding to the netflow data, has been detected. In one example, security monitoring system 130 may report the potentially malicious activity to another system, such as feedback and reporting system 150 and/or another system. In one example, the record netflow data may also be recorded when the risk threshold is exceeded (block 560).

As depicted in FIG. 5, process 500 may also include receiving feedback data associated with potentially malicious activity (block 570). For example, security monitoring system 130 may receive feedback data associated with the potentially malicious activity discussed above as being reported. In some implementations, security monitoring system 130 may receive the feedback data from feedback and reporting system 150. The feedback data may include any variety of information corresponding to the potentially malicious activity or another aspect of security monitoring system 130. For example, the feedback data may include status information (e.g., active, closed, misreported, etc.) identifying a current status of an investigation corresponding to the potentially malicious activity.

Process 500 may also, or alternatively, include updating netflow evaluation operations based on the feedback data (block 580). For example, security monitoring system 130 may update netflow evaluation operations based on the feedback data received from feedback and reporting system 150. For instance, if the feedback data indicates that the potentially malicious activity was misreported (e.g., the potentially malicious activity was not actually malicious activity), security monitoring system 130 may modify the netflow signatures and/or activity watchlist used to previously evaluate the netflow data. Additionally, or alternatively, security monitoring system 130 may modify the manner in which the security monitoring system 130 determines future risk factors or modify the risk threshold. In this manner, security monitoring system 130 may implement a feedback loop to update and enhance security monitoring capabilities.

While FIG. 5 shows a flowchart diagram of an example process 500 for system security monitoring, in other implementations, a process for system security monitoring may include fewer operations, different operations, differently arranged operations, or additional operations than depicted in FIG. 5. For example, in some implementations, security monitoring system 130 may provide feedback and reporting system 150 with one or more flow maps corresponding to the netflow data. A flow map may include a graphical image representing significant geographic locations, such as geographic locations of external activity systems 140 that have contacted, or are contacting, target system 110. A flow map may also, or alternatively, include identifiers (e.g., IP addresses) of the most active external activity systems 140, particular types of file transfers, activity corresponding to well-known ports (e.g., port 21, 25, 80, 443, etc.), remote access connections, netflow signature matches, identifiers corresponding to the external activity systems 140 involved in high-volume data transfers, activity watchlist matches, connections made at certain times of day, etc.

In another example, security monitoring system 130 may enable target system 110, feedback and reporting system 150, or another type of system to configure operations and/or processes performed by security monitoring system 130. Examples of such operations and/or processes may include evaluating netflow data, determining a risk factor, determining whether the risk factor exceeds a risk threshold, the manner in which potentially malicious activity is reported or otherwise escalated (e.g., whether the malicious activity will be reported via electronic message, telephone call, etc.), the content provided in reporting potentially malicious activity, etc. In yet another example, security monitoring system 130 may also, or alternatively, enable feedback and reporting system 150 to make ad-hoc requests for information, such as one or more of the types of information provided to feedback and reporting system 150 when potentially malicious activity is reported.

Figure 7:
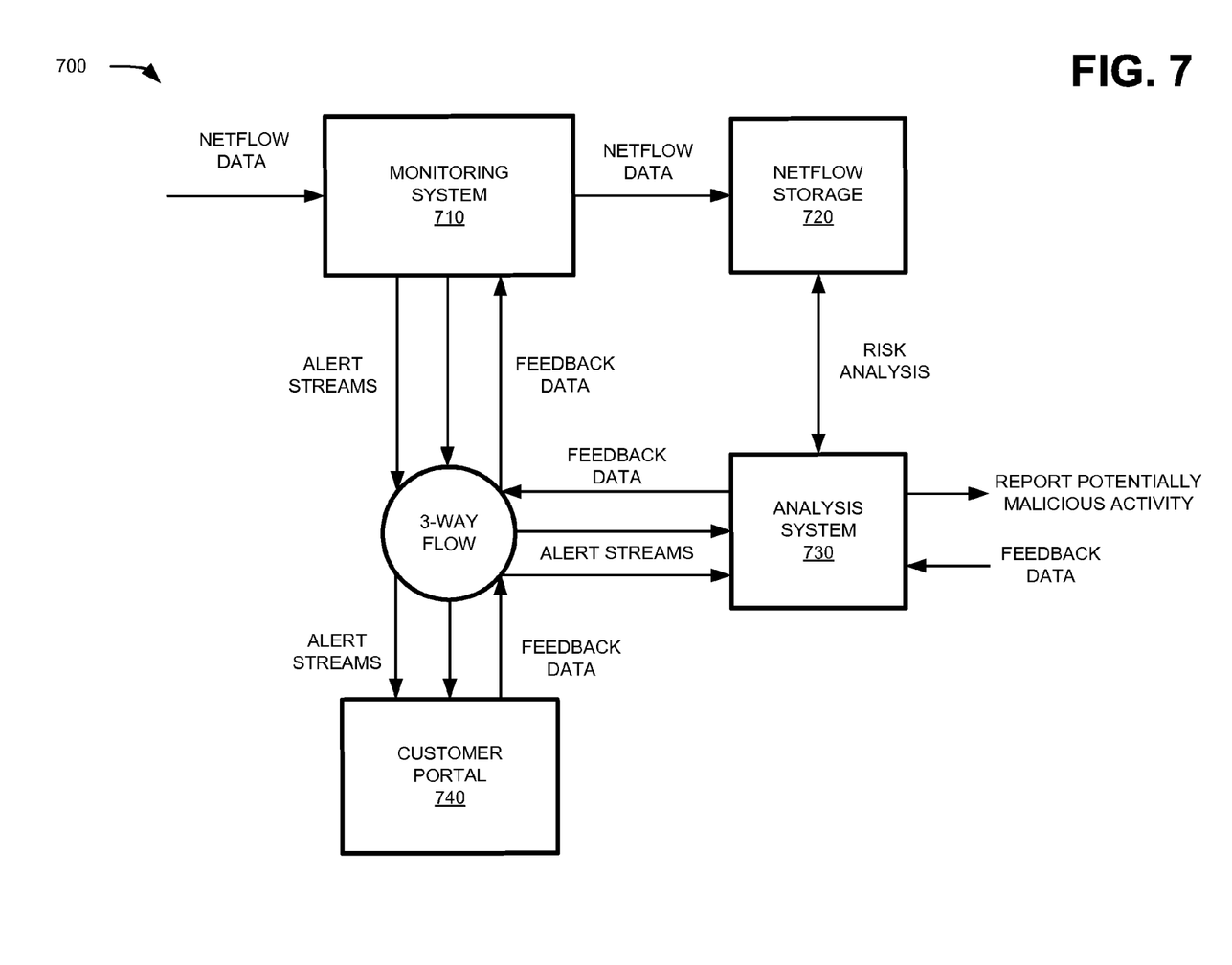
FIG. 7 is a diagram of an example of the process described in FIG. 5.

FIG. 7 is a diagram of an example 700 of process 500. As depicted in FIG. 7, example 700 may include a monitoring system 710, a netflow storage 720, an analysis system 730, and a customer portal 740. In some implementations, monitoring system 710, netflow storage 720, and/or analysis system 730 may correspond to security monitoring system 130, and customer portal 740 may correspond to feedback and reporting system 150. In addition, the number of systems, illustrated in FIG. 7, is provided for explanatory purposes only. In practice, there may be additional systems, fewer systems, different systems, or differently arranged systems than illustrated in FIG. 7.

As illustrated in FIG. 7, monitoring system 710 may receive netflow data. As mentioned above, the netflow data may be received from netflow collection device 122, and may correspond to target system 110. Monitoring system 710 may evaluate the netflow data based on one or more netflow signatures and/or an activity watchlist. Monitoring system 710 may also, or alternatively, communicate the netflow data to netflow storage 720. Additionally, or alternatively, monitoring system 710 may communicate one or more alert streams or reports based on the evaluation of the netflow data. In one example, one alert stream may correspond to the evaluation of the netflow data based on the netflow signatures and another alert stream may correspond to the evaluation of the netflow data based on the activity watchlist.

As depicted in FIG. 7, one or more of the alert streams may be received by analysis system 730, and analysis system 730 may determine a risk factor corresponding to target system 110 and determine whether the risk factor exceeds a risk threshold that may also, or alternatively, correspond to target system 110. In some implementations, analysis system 730 may determine the risk factor by retrieving the netflow data from netflow storage 720 and/or comparing the netflow data with additional netflow data corresponding to related netflows. Comparing the netflow data with additional netflow data may enable analysis system 730 to better characterize or identify the risk associated with the netflow data corresponding to the alert streams. Additionally, or alternatively, analysis system 730 may escalate the alert stream (e.g., report the netflow data) if the risk factor exceeds the risk threshold.

As is also depicted in FIG. 7, customer portal may also, or alternatively, receive one or more of the alert streams to notify a corresponding entity (e.g., a customer purchasing the services of security monitoring system 130) of potentially malicious activity. Additionally, or alternatively, customer portal 740 may provide feedback data to monitoring system 710. Feedback data may also, or alternatively, be received by monitoring system 710 via analysis system 730. The feedback data received by analysis system 730 may originate from customer portal 740 or another device corresponding to feedback and reporting system 150. Analysis system 730 and/or monitoring system 710 may use the feedback data to enhance one or more of the operations mentioned above, such as evaluating the netflow data based on netflow signatures or an activity watchlist, determining a risk factor, and/or determining whether the risk factor exceeds a risk threshold.

Accordingly, systems or devices may be used to monitor system security. For example, security monitoring system 130 may receive netflow data corresponding to target system 110, and evaluate the netflow data based on one or more netflow signatures and/or an activity watchlist. Security monitoring system 130 may also, or alternatively, determine a risk factor associated with the netflow data and determine whether the risk factor exceeds a risk threshold. In some implementations, if the risk factor exceeds the risk threshold, security monitoring system 130 may store the netflow data and report that potentially malicious activity has been detected. However, if the risk factor does not exceed the risk threshold, security monitoring system 130 may store the netflow data for later use (e.g., to enhance the analysis of related netflow data). Security monitoring system 130 may also, or alternatively, receive feedback data and may modify one or more of the forgoing operations based on the feedback data.

As such, since security monitoring system 130 is capable of evaluating network activity (e.g., netflow data), security monitoring system 130 may reduce or illuminate the need for on-site or internal investigations or evaluations, in addition to hardware and/or software within target system 110 for internal investigations and evaluations. Since security monitoring system 130 may be capable of evaluating netflow data, security monitoring system 130 may not be bound by investigating internal system activity or hardware/software within target system 110. Rather, security monitoring system 130 may provide a solution to monitoring system security from an external or network perspective. In addition, since the netflow signatures used by security monitoring system 130 may include a wide variety of events occurring in a particular order and/or within a particular amount of time, security monitoring system 130 may provide a solution to sifting through significant amounts of netflow data to identify malicious activity. Further, the use of discrete data structures, such as netflow signatures, in identifying potentially malicious activity may enable security monitoring system 130 to more efficiently analyze netflow data in real-time. Moreover, the use of a risk threshold may enable security monitoring system 130 to customize the level of reporting sensitivity according to the requirements of a particular target system. Also, enabling security monitoring system 130 to receive and modify one or more operations or processes based on feedback data may enable security monitoring system 130 to become continuously more accurate and efficient.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain implementations may involve a component that performs one or more functions. These components may include hardware, such as an ASIC or a FPGA, or a combination of hardware and software.

Even though particular combinations of features are recited in the claims and/or disclosed in the specification, these combinations are not intended to limit disclosure of the possible implementations. In fact, many of these features may be combined in ways not specifically recited in the claims and/or disclosed in the specification. Although each dependent claim listed below may directly depend on only one other claim, the disclosure of the implementations includes each dependent claim in combination with every other claim in the claim set.

No element, act, or instruction used in the present application should be construed as critical or essential to the implementations unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
receiving, by a computing device, netflow data, where the netflow data comprises information corresponding to network-side activity associated with a target device;
performing, by the computing device, a plurality of netflow data evaluation operations, including:
evaluating the netflow data based on a netflow signature to identify a potentially malicious activity, where the netflow signature comprises information corresponding to two or more network events occurring in a particular order;
generating first alert data corresponding to the evaluating of the netflow data based on the netflow signature;
evaluating the netflow data based on an activity watchlist to identify the potentially malicious activity, where the activity watchlist comprises an identifier corresponding to an external activity device;
generating second alert data corresponding to the evaluating of the netflow data based on the activity watchlist;
determining a risk factor associated with the first and second alert data based on a level of risk associated with a type of the potentially malicious activity;
determining whether the risk factor exceeds a first risk threshold for the level of risk associated with the type of the potentially malicious activity, wherein use of the first risk threshold enables customization of a first level of reporting sensitivity according to requirements of the target device and differs from a second risk threshold that enables customization of a second level of reporting sensitivity according to requirements of another target device, and wherein the first risk threshold differs from a third risk threshold corresponding to another type of malicious activity;
storing, based on a determination that the risk factor does not exceed the first risk threshold, the netflow data;
reporting, to another computing device, that the potentially malicious activity has been detected based on a determination that the risk factor exceeds the first risk threshold, and
receiving, in response to the reporting, feedback including information regarding the netflow signature, the risk factor, the determination of the risk factor, the first risk threshold, and a current status of a security investigation of the potentially malicious activity, wherein the current status is misreported; and
updating, by the computing device when the current status is misreported, the netflow signature, the activity watchlist, the determination of the risk factor, and the first risk threshold based on the feedback.

2. The method of claim 1, wherein the activity watchlist comprises at least one of:
an identifier corresponding to an external activity system previously identified as a source of malicious activity,
an identifier corresponding to an external activity system previously identified as a source of suspicious activity, or
an identifier corresponding to an external activity system previously involved in a system security investigation.

3. The method of claim 1, where the netflow signature comprises information corresponding to the two or more network events occurring within a particular amount of time.

4. The method of claim 1, wherein the netflow signature comprises information corresponding to at least one of:
pre-attack research corresponding to the target device,
points of intrusion corresponding to the target device,
unauthorized access corresponding to the target device,
data extraction corresponding to the target device,
malicious activity corresponding to the target device, or
criminal activity corresponding to the target device.

5. The method of claim 1, where the at least one of the plurality of netflow data evaluation operations comprises one of:
the evaluating of the netflow data based on the netflow signature, or
the evaluating of the netflow data based on the activity watchlist.

6. The method of claim 1, wherein the at least one of the plurality of netflow data evaluation operations comprises an operation to determine the risk factor based on the netflow data.

7. The method of claim 1, wherein the at least one of the plurality of netflow data evaluation operations comprises an operation to determine the risk threshold corresponding to the target device.

8. The method of claim 1, wherein the at least one of the plurality of netflow data evaluation operations comprises an operation to report the potentially malicious activity.

9. The method of claim 1, wherein determining the risk factor associated with the first alert data is further based on a comparison of the netflow data to other netflow data corresponding to related netflows.

10. The method of claim 1, wherein reporting to the other computing device comprises escalating one of the first alert data or the second alert data.

11. A computing device, comprising:
a memory comprising instructions; and
a processor, connected to the memory, to execute the instructions to:
receive netflow data from an activity collection system, where the netflow data comprises information corresponding to network-side activity associated with a target device;
evaluate the netflow data based on a netflow signature to identify a potentially malicious activity, where the netflow signature comprises information corresponding to two or more network events occurring in a particular order;
generate first alert data corresponding to the evaluation of the netflow data based on the netflow signature;

evaluate the netflow data based on an activity watchlist to identify the potentially malicious activity, where the activity watchlist comprises an identifier corresponding to an external activity device;

generate second alert data corresponding to the evaluation of the netflow data based on the activity watchlist;

determine a risk factor associated with the first alert data and second alert data based on a level of risk associated with a type of the potentially malicious activity;

determine whether the risk factor exceeds a first risk threshold for the level of risk associated with the type of the potentially malicious activity, wherein use of the first risk threshold enables customization of a first level of reporting sensitivity according to requirements of the target device and differs from a second risk threshold that enables customization of a second level of reporting sensitivity according to requirements of another target device, and wherein the first risk threshold differs from a third risk threshold corresponding to another type of malicious activity;

store, based on a determination that the risk factor does not exceed the first risk threshold, the netflow data;

report, to another computing device, that the potentially malicious activity has been detected based on a determination that the risk factor exceeds the first risk threshold;

receive, in response to the reporting, feedback including information regarding the netflow signature, the risk factor, the determination of the risk factor, the first risk threshold, and a current status of a security investigation of the potentially malicious activity, wherein the current status is misreported; and update, when the current status is misreported, the netflow signature, the activity watchlist, the determination of the risk factor, and the first risk threshold based on the feedback.

12. The computing device of claim 11, wherein the activity watchlist comprises at least one of:
an identifier corresponding to an external activity system previously identified as a source of malicious activity,
an identifier corresponding to an external activity system previously identified as a source of suspicious activity, or
an identifier corresponding to an external activity system previously involved in a system security investigation.

13. The computing device of claim 11, where the netflow signature comprises information corresponding to the two or more network events occurring within a particular amount of time.

14. The computing device of claim 11, wherein the netflow signature comprises information corresponding to at least one of:
pre-attack research corresponding to the target device,
points of intrusion corresponding to the target device,
unauthorized access corresponding to the target device,
data extraction corresponding to the target device,
malicious activity corresponding to the target device, or
criminal activity corresponding to the target device.

15. The computing device of claim 11, wherein when the current status is misreported, the processor is further to update:
the determination of the risk factor based on the netflow data,
the determination of the first risk threshold corresponding to the target device, or
the report of the potentially malicious activity.

16. One or more non-transitory computer-readable storage media, comprising:
one or more instructions that, when executed by a processor, cause the processor to:
receive netflow data from an activity collection system, where the netflow data comprises information corresponding to network-side activity associated with a target device;

evaluate the netflow data based on a netflow signature to identify a potentially malicious activity, where the netflow signature comprises information corresponding to two or more network events occurring in a particular order;

generate first alert data corresponding to the evaluation of the netflow data based on the netflow signature;

evaluate the netflow data based on an activity watchlist to identify the potentially malicious activity, where the activity watchlist comprises an identifier corresponding to an external activity device;

generate second alert data corresponding to the evaluating of the netflow data based on the activity watchlist;

determine a risk factor associated with the first alert data and second alert data based on a level of risk associated with a type of the potentially malicious activity;

determine whether the risk factor exceeds a first risk threshold for the level of risk associated with the type of the potentially malicious activity, wherein use of the first risk threshold enables customization of a first level of reporting sensitivity according to requirements of the target device and differs from a second risk threshold that enables customization of a second level of reporting sensitivity according to requirements of another target device, and wherein the first risk threshold differs from a third risk threshold corresponding to another type of malicious activity;

store, based on a determination that the risk factor does not exceed the first risk threshold, the netflow data;

report, to another computing device, that potentially malicious activity, corresponding to the netflow data, has been detected based on the evaluation of the netflow data;

receive, in response to the reporting, feedback including information regarding the netflow signature, the risk factor, the determination of the risk factor, the first risk threshold, and a current status of a security investigation of the potentially malicious activity, wherein the current status is misreported; and update, when the current status is misreported, the netflow signature, the activity watchlist, the determination of the risk factor, and the first risk threshold based on the feedback.

17. The non-transitory computer-readable storage media of claim 16, where the one or more instructions cause the processor further to:
evaluate the netflow data based on an activity watchlist to identify potentially malicious activity, where the activity watchlist comprises at least one of:
an identifier corresponding to an external activity system previously identified as a source of malicious activity, an identifier corresponding to an external activity system previously identified as a source of suspicious activity, or an identifier corresponding to an external activity system previously involved in a system security investigation.

18. The non-transitory computer-readable storage media of claim 16, wherein the netflow signature comprises information corresponding to at least one of:

pre-attack research corresponding to the target device,
points of intrusion corresponding to the target device,
unauthorized access corresponding to the target device,
data extraction corresponding to the target device,
malicious activity corresponding to the target device, or
criminal activity corresponding to the target device.

19. The non-transitory computer-readable storage media of claim 16, where when the current status is misreported, the one or more instructions cause the processor further to update:

the determination of the risk factor based on the netflow data, the determination of the first risk threshold corresponding to the target device, or the report of the potentially malicious activity.

* * * * *